(12) United States Patent
Yang et al.

(10) Patent No.: US 7,824,092 B2
(45) Date of Patent: Nov. 2, 2010

(54) BACKLIGHT MODULE HAVING A PLURALITY OF GROUPS OF CONCENTRIC MICROSTRUCTURES ON REFLECTIVE SURFACE THEREOF

(75) Inventors: Bo Yang, Beijing (CN); Guo-Fan Jin, Beijing (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 321 days.

(21) Appl. No.: 11/865,623

(22) Filed: Oct. 1, 2007

(65) Prior Publication Data

US 2008/0123366 A1 May 29, 2008

(30) Foreign Application Priority Data

Nov. 29, 2006 (CN) .................. 2006 1 0157135

(51) Int. Cl.
*F21V 7/04* (2006.01)
(52) U.S. Cl. ............... 362/623; 362/612; 362/615; 362/619
(58) Field of Classification Search .......... 362/97.1, 362/600, 606, 608, 609, 611, 612, 620, 623, 362/625, 626

See application file for complete search history.

(56) References Cited

U.S. PATENT DOCUMENTS

| | | | | |
|---|---|---|---|---|
| 6,036,327 | A * | 3/2000 | Blonder et al. | 362/611 |
| 6,582,095 | B1 * | 6/2003 | Toyoda | 362/235 |
| 2001/0053075 | A1 * | 12/2001 | Parker et al. | 362/31 |
| 2002/0163790 | A1 * | 11/2002 | Yamashita et al. | 362/31 |
| 2005/0253980 | A1 | 11/2005 | Saito et al. | |
| 2007/0019435 | A1 * | 1/2007 | Sakurai et al. | 362/611 |

FOREIGN PATENT DOCUMENTS

| | | |
|---|---|---|
| CN | 1680853 A | 10/2005 |
| CN | 1797106 A | 10/2006 |
| JP | 2004-53665 | 2/2004 |
| JP | 2004-111384 | 4/2004 |

* cited by examiner

*Primary Examiner*—Sandra L O Shea
*Assistant Examiner*—Danielle Allen
(74) *Attorney, Agent, or Firm*—Jeffrey T. Knapp

(57) ABSTRACT

A backlight module includes a light source and a light guide plate. The light source includes a light-emitting surface and at least two mean points. The light guide plate includes an incident surface, an emitting surface adjacent to the incident surface, a reflecting surface opposite to the emitting surface, and at least two groups of microstructures formed on the reflecting surface. Each group of microstructures is arranged concentric relative to a respective mean point of the light-emitting surface of the light source.

18 Claims, 7 Drawing Sheets

US 7,824,092 B2

BACKLIGHT MODULE HAVING A PLURALITY OF GROUPS OF CONCENTRIC MICROSTRUCTURES ON REFLECTIVE SURFACE THEREOF

BACKGROUND

1. Field of the Invention

The present invention relates to backlight modules used in liquid crystal displays and, particularly, to a backlight module having a specially constructed reflective surface.

2. Discussion of Related Art

In a typical liquid crystal display, a backlight module provides a surface light source for illuminating the liquid crystal display. Generally, the backlight module includes a light guide plate and a light source arranged adjacent to one side of the light guide plate. The light guide plate changes light beams received from the light source (e.g., a point or linear light source) into surface/area light beams and directs such surface light beams to a liquid crystal panel of the liquid crystal display.

FIGS. 5 and 6 show a conventional backlight module 10. The backlight module 10 includes a light guide plate (LGP) 14 and a point light source 12 adjacent to the LGP 14. The LGP 14 includes an incident surface 142, an emitting surface 144 adjacent to the incident surface 142, a reflecting surface 146 opposite to the emitting surface 144, and three side surfaces (not labeled). The LGP 14 changes light beams received from the point light source 12 into surface light beams and directs surface light beams out of the emitting surface 144.

To improve the uniformity and efficiency of illumination of the backlight module 10, a number of microstructures 162 are arranged on the reflecting surface 146. The microstructures are concentric relative to the point light source 12. In operation, light beams emitted from the point light source 12 propagate within the LGP 14 toward the microstructures 162, in directions perpendicular thereto. Light beams are reflected and/or refracted at the microstructures 162 and are emitted from the emitting surface 144. Due to the distribution of microstructures 162, the diffusion of the light beams is reduced (i.e., the wasting of the light beam is decreased), the transfer efficiency of the LGP 14 is enhanced, and, thus, more surface light beams are emitted from the emitting surface 144.

However, there is ongoing demand for backlight modules to provide an even more improved brightness and uniformity of illumination. A new backlight module that can meet this demand is desired.

SUMMARY OF THE INVENTION

A backlight module incorporates a light source and a light guide plate. The light source includes a light-emitting surface and at least two mean points. The light guide plate has an incident surface, an emitting surface adjacent to the incident surface, a reflecting surface opposite to the emitting surface, and at least two groups of microstructures formed on the reflecting surface. Each group of microstructures is concentric relative to a respective mean point of the light-emitting surface of the light source. Within this configuration/arrangement, the brightness, uniformity, and efficiency of illumination can be further enhanced.

BRIEF DESCRIPTION OF THE DRAWINGS

Many aspects of the present backlight module can be better understood with reference to the following drawings. The components in the drawings are not necessarily to scale, the emphasis instead being placed upon clearly illustrating the principles of the present backlight module.

Figure 1:
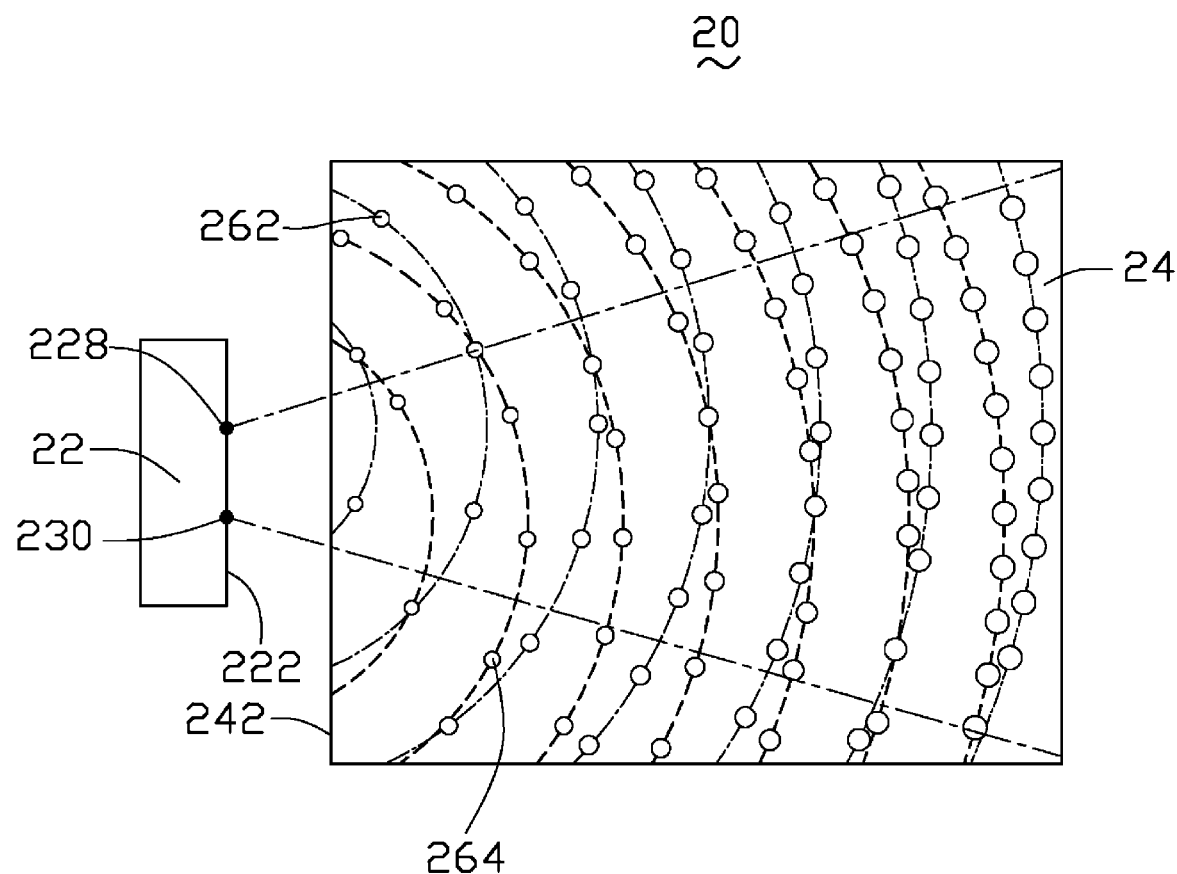
FIG. 1 is a schematic, top plan view of a backlight module, according to a first present embodiment.

Corresponding reference characters indicate corresponding parts throughout the several views. The exemplifications set out herein illustrate at least one preferred embodiment of the present backlight module, in one form, and such exemplifications are not to be construed as limiting the scope of the invention in any manner.

DETAILED DESCRIPTION OF PREFERRED EMBODIMENTS

Reference will now be made, in detail, to the drawings to describe embodiments of the present backlight module.

Figure 2:
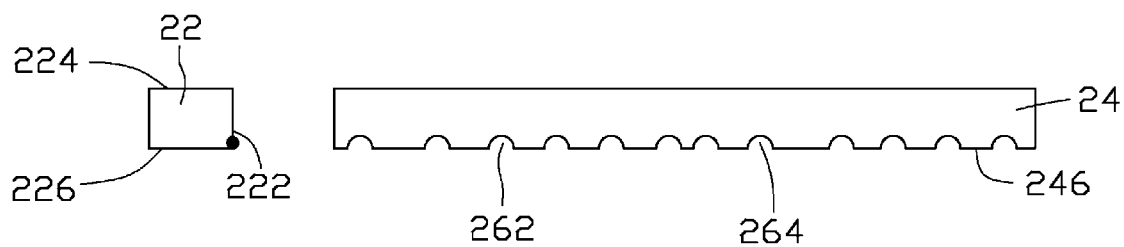
FIG. 2 and FIG. 2A are schematic, side views of a backlight module, according to the first present embodiment.

Referring to FIG. 1 and FIG. 2, a backlight module 20, according to the first embodiment, includes a light source 22 and a light guide plate (LGP) 24. The LGP includes an incident surface 242, an emitting surface 244 adjacent and, advantageously, perpendicular to the incident surface 242, and a reflecting surface 246 opposite to the emitting surface 244. The reflecting surface 246 includes a first group of microstructures 262 and a second group of microstructures 264. The light source 22 is adjacent to the incident surface 242. The light source 22 includes a light-emitting surface 222 opposite to the incident surface 242, a top surface 224, and a bottom surface 226 adjacent to (i.e., intersecting) the light-emitting surface 222. The light source 22 can be at least one light emitting diode (LED), a mercury lamp, or a like light-generating apparatus. In this embodiment, the light source 22 is a LED.

The LGP 24 can, usefully, be made of any of a various kinds of highly transparent synthetic resins, such as acrylic resin, polycarbonate resin, vinyl chloride resin, polymethyl methacrylate (PMMA) resin, etc. In particular, PMMA resin provides excellent light transmission, heat resistance, dynamic characteristics, molding performance, processing performance, etc. Thus, in this embodiment, the LGP 24 is made of PMMA resin.

Figure 3:
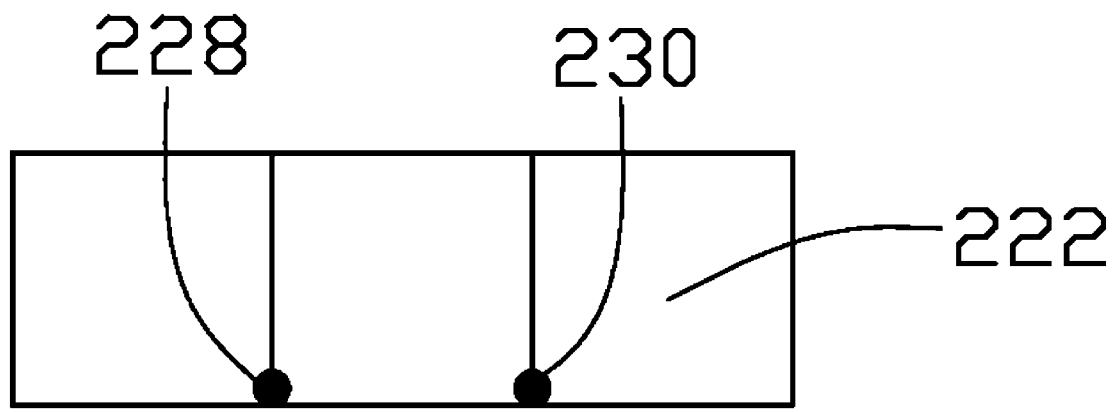
FIG. 3 is a schematic view of a light-emitting surface of the light source applied in the backlight module, according to the first present embodiment.

Referring to FIG. 3, the light-emitting surface 222 is divided into three equal portions by two mean lines. The mean lines are perpendicular to the top surface 224 and to the bottom surface 226 and intersect with the bottom surface 226 at the mean points 228, 230. An overall shape/pattern of each microstructure 262, 264 is part of a corresponding imaginary circle (i.e., each microstructure 262, 264 is semicircular/arcuate (e.g., continuous groove) and/or arranged in a semicircle/arc (e.g., a plurality of distinct dots/recesses)). In particular, the first group of microstructures 262 is generally concentric relative to the mean point 228, and the second group of microstructures 264 is concentric relative to the mean point 230.

Figure 2A:
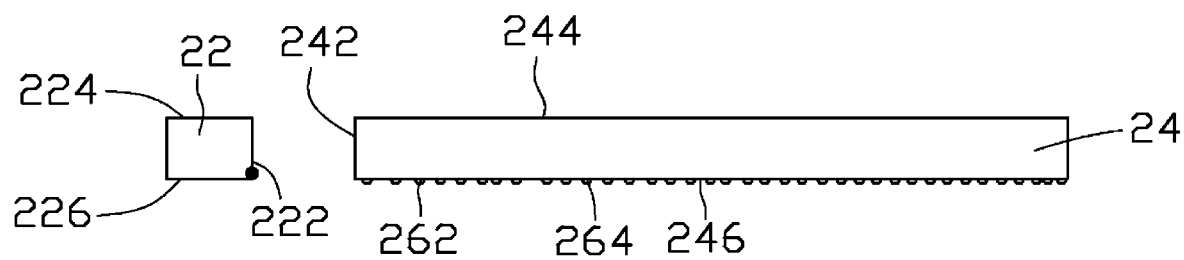

Each microstructure 262, 264 may, for example, be made up of a plurality of diffusion dots or diffusion recesses, together patterned into the desired semicircle/arc. The diffusion dots and/or diffusion recesses may, e.g., be generally sub-hemispherical, cylindrical, parallelepiped-shaped, pyramidal, or frustum-shaped. The diffusion dots and/or diffusion recesses are, beneficially, formed concavely or convexly in/on the reflecting surface 246 (i.e., grooving into or protruding directly from the reflecting surface 246 as show in FIG. 2 and FIG. 2A).

For enhancing the uniformity of light emission, the distances between the adjacent microstructures of the same group are, beneficially, equal. Further, the overlaps between the first group of microstructures 262 and the second group of microstructures 264 are decreased, by adjusting the distances between the adjacent microstructures of the different groups and/or by arranging only one microstructure of the first group or the second group on the each overlap therebetween. Opportunely, the size and density of the microstructures 262, 264 progressively increase with increasing distance away from the incident surface 242. With this configuration, the brightness and uniformity of illumination can be improved overall.

For enhancing the efficiency of illumination, a reflective film (not labeled) can be disposed on the reflecting surface 246 of the LGP 14.

Figure 4:
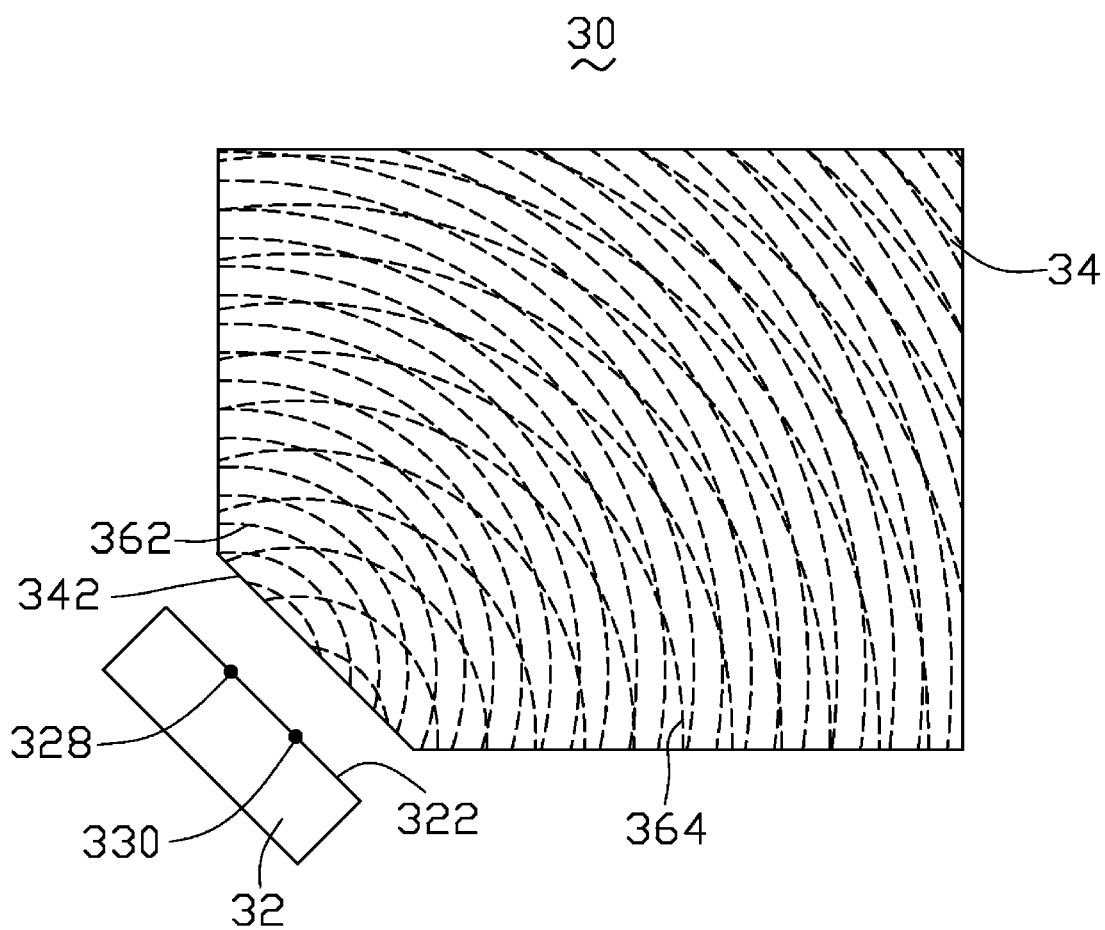
FIG. 4 is a schematic, top plan view of a backlight module according to a second present embodiment.
Figure 5:
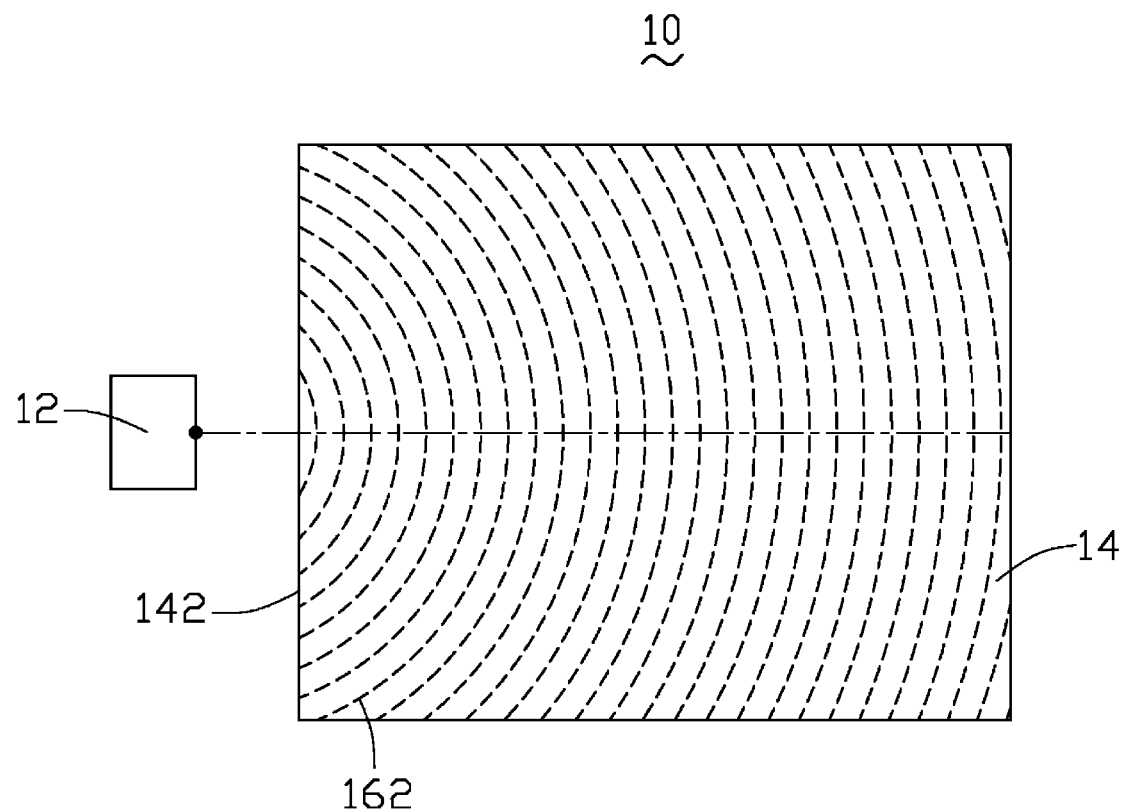
FIG. 5 is a schematic, top plan view of a conventional backlight module.
Figure 6:
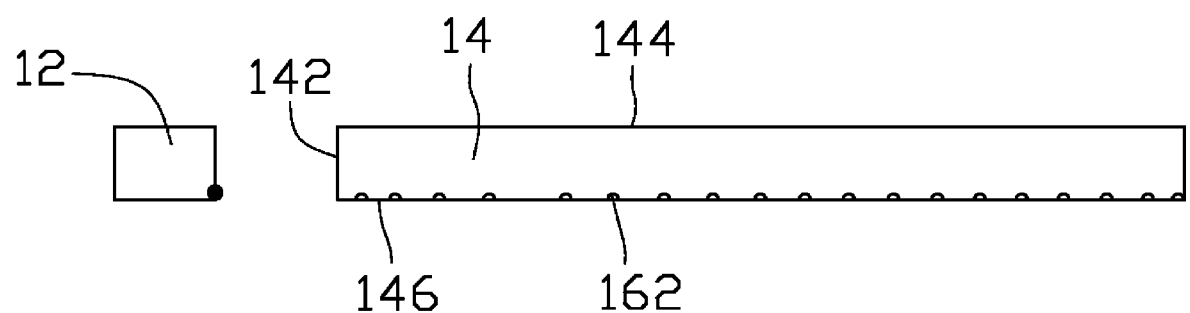
FIG. 6 is a schematic, side view of the conventional backlight module.

Referring to FIG. 4, a backlight module 30, according to the second embodiment of the present backlight module, includes a light source 32 and a LGP 34. The LGP 34 includes an incident surface 342, an emitting surface (not labeled) adjacent to (i.e., intersecting) the incident surface 342, and a reflecting surface (not labeled) opposite to the emitting surface. The reflecting surface includes a first group of microstructures 362 and a second group of microstructures 364. The light source 32 includes a light-emitting surface 322 opposite to the incident surface 342, a top surface (not labeled), and a bottom surface (not labeled). The light-emitting surface 322 is divided into three equal portions by two mean lines. The mean lines are perpendicular to the top surface and the bottom surface and intersect with the bottom surface at the mean points 328, 330. An overall shape/pattern of each microstructure 362, 364 is part of a corresponding imaginary circle. Like in the first embodiment, the first group of microstructures 362 is generally concentric relative to the mean point 328, and the second group of microstructures 364 is concentric relative to the mean point 330. The backlight module 30, in accordance with the second embodiment, is the same as the first embodiment, except that the light source 32 is adjacent to a truncated corner of the LGP 34, and the truncated corner is adjacent to (i.e., intersects (e.g., orthogonally)) the emitting surface.

The above-described embodiments are intended to illustrate the scope of the invention and not restrict the scope of the invention. For example, the incident surface may be divided into more equal portions by more mean lines, and then more mean poins are attained. The more mean points that are defined, the more groups of microstructures that are formed on the reflecting surface of the LGP. Each group of microstructures is respectively concentric with a corresponding mean point. Within this configuration, the brightness, uniformity and efficiency of illumination can be enhanced further.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A backlight module, comprising:
   a single light source comprising a light-emitting surface having at least two mean points thereon; and
   a light guide plate comprising:
      an incident surface;
      an emitting surface adjacent to the incident surface;
      a reflecting surface opposite to the emitting surface; and
      at least two groups of microstructures formed on the reflecting surface and located corresponding to the single light source, wherein each group of microstructures is arranged concentric relative to a respective mean point of the light-emitting surface of the single light source.

2. The backlight module as claimed in claim 1, wherein the number of the mean points is equal to the number of groups of the microstructures.

3. The backlight module as claimed in claim 1, wherein the light source is a light emitting diode.

4. The backlight module as claimed in claim 1, wherein the light source is adjacent to the incident surface or a truncated corner of the light guide plate.

5. The backlight module as claimed in claim 1, wherein the light-emitting surface of the light source is adjacent to the incident surface or a corner of the light guide plate.

6. The backlight module as claimed in claim 1, wherein each of the at least two mean points is located on a mean line of the light-emitting surface.

7. The backlight module as claimed in claim 1, wherein the distances between adjacent microstructures of the same group are equal.

8. The backlight module as claimed in claim 1, wherein the spaces between the groups of the microstructures are different.

9. The backlight module as claimed in claim 1, wherein the size of the microstructures progressively increases with increasing distance from the incident surface.

10. The backlight module as claimed in claim 1, wherein only one microstructure is arranged at each overlap between two groups of microstructures.

11. The backlight module as claimed in claim 1, wherein the density of the microstructures progressively increases with increasing distance from the incident surface.

12. The backlight module as claimed in claim 1, wherein each microstructure is a protrusion or a recess.

13. The backlight module as claimed in claim 1, wherein the light guide plate comprises a material that is selected from the group consisting of acrylic resin, polycarbonate resin, vinyl chloride resin and polymethyl methacrylate resin.

14. The backlight module as claimed in claim 6, wherein the light source further comprises a top surface and a bottom surface, and both the top surface and the bottom surface are adjacent to the light-emitting surface.

15. The backlight module as claimed in claim 14, wherein the mean lines are perpendicular to the top surface and the bottom surface and intersect with the bottom surface at the mean points.

16. The backlight module as claimed in claim 6, wherein the light-emitting surface is divided into three equal portions by two mean lines.

17. A backlight module, comprising:
   a light source comprising a light-emitting surface having a first mean point and a second mean point thereon; and a light guide plate comprising:
 an incident surface;
 an emitting surface adjacent to the incident surface;
 a reflecting surface opposite to the emitting surface;
 a first group of microstructures formed on the reflecting surface and arranged to form a plurality of first concentric circles around the first mean point; and
 a second group of microstructures formed on the reflecting surface and arranged to form a plurality of second concentric circles around the second mean point, wherein an innermost of the plurality of first concentric circles overlaps an innermost of the plurality of second concentric circles.

18. The backlight module as claimed in claim 17, wherein only one microstructure is arranged at each overlap between the plurality of first concentric circles and the plurality of second concentric circles.

* * * * *

UNITED STATES PATENT AND TRADEMARK OFFICE
CERTIFICATE OF CORRECTION

PATENT NO. : 7,824,092 B2
APPLICATION NO. : 11/865623
DATED : November 2, 2010
INVENTOR(S) : Bo Yang and Guo-Fan Jin It is certified that error appears in the above-identified patent and that said Letters Patent is hereby corrected as shown below:

Title Pg, Item (73) regarding "Assignees" on the front page of the Patent should read:

--(73) Assignees: Tsinghua University, Beijing (CN); Hon Hai Precision Industry Co. Ltd., Tu-Cheng, Taipei Hsien (TW).--.

Signed and Sealed this
Fifteenth Day of February, 2011

David J. Kappos
*Director of the United States Patent and Trademark Office*